A. Rank.
Mower.
No. 105,597.  Patented July 19, 1870.
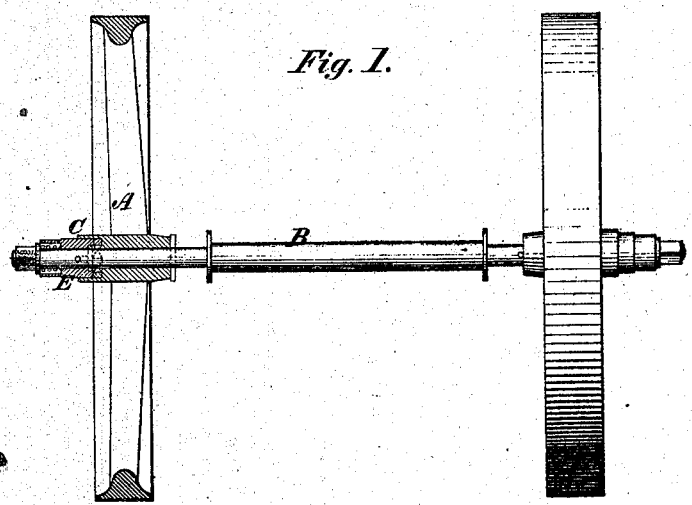
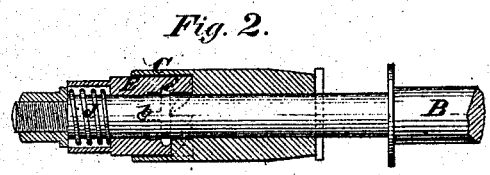
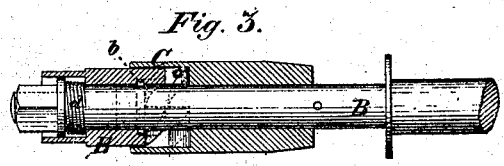
 
Witnesses:
Joel Peyton
Wm. H. Payne
Inventor:
Amos Rank
by his Atty.
Wm. D. Baldwin

UNITED STATES PATENT OFFICE.

AMOS RANK, OF SALEM, OHIO.

IMPROVEMENT IN HARVESTERS.

Specification forming part of Letters Patent No. 105,597, dated July 19, 1870.

*To all whom it may concern:*

Be it known that I, AMOS RANK, of Salem, in the county of Columbiana and State of Ohio, have invented a new and useful Improvement in Harvesters, of which the following is a specification:

My invention relates to an improved mode of connecting the main axle and driving-wheel of a harvester in such manner that the wheel will be locked with the axle while moving forward, but turn independently thereof when moving backward; and The improvement herein claimed consists in the combination of a main axle, a driving-wheel turning freely on said axle, and carrying a feathered clutch, a correspondingly-feathered clutch sliding endwise and turning freely on said axle, said clutch having a longitudinal slot in which a locking-pin on the axle engages to lock the driving-wheel to the axle, a circumferential groove in which the pin may rest to hold the wheel out of gear, and a spring to hold the clutches in contact when released from the pin, substantially as hereinafter set forth.

In the accompanying drawing, which shows such parts only as are necessary to illustrate my invention, Figure 1 is a front elevation of the driving-wheels and main axle, one of the wheels being shown in section as in gear. Fig. 2 is a longitudinal section through the clutch when in gear; Fig. 3, a similar view when out of gear; Fig. 4, an end view; and Fig. 5, a section of the clutch-ring.

The driving-wheel A turns freely on the main axle B, and has a feathered clutch, $c$, in its hub. A correspondingly-feathered clutch-ring, E, turns and moves freely endwise on the axle B, and is so constructed as partially to be inclosed within the shell C of the hub. A pin, $b$, on the axle, enters a longitudinal slot, $c$, in the clutch E, and locks it and the axle together in certain positions, as hereinafter explained. A circumferential groove, $e'$, is also formed on the inside of the clutch E, into which the pin $b$ may enter when it is desired to have the wheel turn independently of the axle. A coiled spring, $d$, inclosed within the shell of the clutch E, tends constantly to press the clutches together.

The clutch-ring and spring are secured on the main axle by the same nut that holds the driving-wheel thereon, and, as the clutch is entirely inclosed, dust and dirt cannot clog it. The clutch-ring E may be turned or moved endwise either by hand or by a lever, as is usual.

In Figs. 1 and 2, in which the wheel is shown as in gear, the pin $b$ is in the longitudinal slot $e$; consequently, the clutch-ring E turns with the axle, and being interlocked with the clutch $c$ on the wheel, turns that also. In backing, the ratchets slip past each other in the usual way.

The clutch-ring E is disconnected by sliding it outward on the axle until the pin $b$ enters the circumferential groove $e'$, and then turning the collar half round on the axle, when the pin will hold the clutches out of gear. When turned half round once more the spring will force the clutches into gear again.

I have found this, in practice, a simple and effective clutch-coupling, free from many objections incident to the use of the ordinary locking ratchets.

I do not claim, broadly, the use of spring-clutches on an axle.

I claim as my invention—

1. The combination of the main axle, its fixed pin, the clutch on the driving-wheel hub, the turning sliding clutch, its longitudinal slot, and circumferential groove, and the spring, all these parts being constructed as herein set forth, for joint operation.

2. The clutch-ring E, constructed as described, with a longitudinal slot, a circumferential groove, and a shell to contain the spiral spring which throws the clutch into gear.

3. The combination of the main axle, the clutch-ring, the spiral spring, and the locking-nut which holds the parts together, all constructed and operating as described.

In testimony whereof I have hereunto subscribed my name.

AMOS RANK.

Witnesses:
SAML. T. STREET,
WILLIS CADWALLADER.